3,311,602
PROCESS FOR THE CHLOROMETHYLATION OF AROMATIC HYDROCARBONS
Charles F. Raley, Jr., Midland, Mich., assignor to The Dow Chemical Company, Midland, Mich., a corporation of Delaware
No Drawing. Filed July 1, 1963, Ser. No. 292,131
11 Claims. (Cl. 260—93.5)

This invention relates to an improved process for the chloromethylation of aromatic materials with an alkyl chloromethyl ether and catalyst. More particularly, it relates to such a process wherein improved reaction rates, conversions, and yields are obtained by regenerating the activity of the catalyst during chloromethylation.

Chloromethylation of aromatic materials to substitute a chloromethyl group for a nuclear aromatic hydrogen is an important and versatile synthetic process applicable to many aromatic materials. Process-wise, it conventionally involves reaction of the aromatic material either with formaldehyde and HCl (Eq. 1) or alternately with an alkyl chloromethyl ether in the presence of a suitable catalyst (Eq. 2).

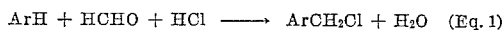

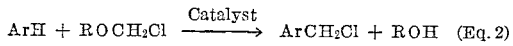

With reactive aromatic compounds, the formaldehyde-HCl process is often satisfactory. However, with less reactive compounds and particularly with polymeric compounds containing aromatic moieties, such as polystyrene and other vinylaromatic polymers, the alkyl chloromethyl ether process is usually preferred.

In United States Patent 2,694,702, Jones describes the chloromethylation of linear vinylaromatic polymers with chloromethyl methyl ether using a mild Friedel-Crafts catalyst such as anhydrous zinc chloride, under controlled reaction conditions to give toluene-soluble products having an average of from 0.1 to 1.0 chloromethyl groups per aromatic nucleus. These chloromethylated polymers are substantially free of cross-linking and are soluble in organic solvents such as benzene, dioxane, methylene chloride, 1,2-dichloroethane, and chloroform. They are highly useful intermediates for the synthesis of other valuable products such as the water-soluble quaternary ammonium derivatives.

For many purposes, it is obviously desirable to obtain a high degree of chloromethylation, i.e., a high average number of chloromethyl groups per aromatic nucleus. However, in the chloromethylation of linear polystyrene it is in practice difficult to introduce an average of more than about 0.85 chloromethyl groups per aromatic nucleus without causing considerable cross-linking and consequent gelation. The more vigorous conditions usually employed to achieve a higher degree of chloromethylation, such as increased catalyst concentration or reaction temperature, also promote cross-linking through further reaction of the substituent chloromethyl groups.

Furthermore, in the Jones process the rate of reaction is observed to decrease rapidly as chloromethylation proceeds. For example, with an essentially linear polystyrene having an average molecular weight of about 25,000 and 5 moles of chloromethyl methyl ether and 0.4 mole of zinc chloride per equivalent of polystyrene, a 50 percent conversion to a monochloromethylated product was obtained in one hour. Conversion thereafter increased to about 63 percent in three hours and to about 72 percent in six hours. Yet only after 24 hours was a soluble product having an average of 0.85 chloromethyl groups per aromatic nucleus obtained.

It has now been discovered that in the chloromethylation of aromatic compounds and polymers containing aromatic groups with an excess of alkyl chloromethyl ether in the presence of a halomethylation catalyst, that improved reaction rates, conversions, and yields are obtained under mild conditions with low catalyst concentrations by adding to the chloromethylation reaction mixture a catalyst regenerator selected from the group consisting of silicon tetrachloride, titanium tetrachloride, sulfur trioxide, oxalyl chloride, phosphorus pentachloride, thionyl chloride and sulfuric acid, in an amount sufficient to regenerate the catalyst.

To illustrate the unexpected and highly beneficial results of this regenerative chloromethylation process, essentially complete monochloromethylation of a linear polystyrene was obtained in 6 hours at room temperature by the addition of 0.5 mole of silicon tetrachloride ($SiCl_4$) per equivalent of polystyrene to a reaction mixture containing 5 moles of chloromethyl methyl ether and 0.1 mole of zinc chloride per equivalent of polystyrene. Under similar conditions without the addition of $SiCl_4$, the conversion to a monochloromethylated product was only 30 percent in 6 hours. Alone $SiCl_4$ is not an active halomethylation catalyst, but when added to a conventional system as a catalyst regenerator the advantageous results described herein are obtained. The resulting chloromethyl polystyrene containing an average of 1.00 chloromethyl groups per aromatic nucleus is soluble in organic solvents such as toluene and methylene chloride, and shows no evidence of gelation or appreciable cross-linking.

Similarly, titanium tetrachloride, sulfur trioxide, oxalyl chloride, phosphorus pentachloride, thionyl chloride, and sulfuric acid have been discovered to be effective as catalyst regenerators in this chloromethylation process. Under standard conditions using a linear polystyrene as a test material, addition of one or more of these catalyst regenerators resulted in yields and conversions at least 20 percent greater than those obtained by the usual chloromethyl methyl ether process without causing gelation. Within this group of additives, $SiCl_4$, titanium tetrachloride ($TiCl_4$), and sulfur trioxide ($SO_3$) are particularly effective in restoring catalyst activity and hence are generally preferred.

Many other reagents have been examined such as phosphorus oxychloride, phosphorus trichloride, acetal chloride, etc. But the efficiency of the indicated catalyst regenerators is markedly superior to that of all other reagents examined. While the reason for this selective activity is not known, it likely involves the reactivity of the reagents with by-product alcohol as well as such other factors as the stability and solubility of the alcoholysis products.

It is believed that the observed decrease in catalyst activity during the reaction is related to the formation of alcohol (ROH) as a primary by-product of the chloromethylation process (cf. Eq. 2). It is known that by-product alcohol reacts with the alkyl chloromethyl ether to form an acetal and HCl. This reaction is, however, reversible and reaches an equilibrium when a sufficient concentration of HCl develops in the system. Additional alcohol then is believed to complex with the catalyst thereby destroying its catalytic activity. Since the catalyst regenerators are extremely strong alcohol scavengers, they are believed to function by removing alcohol from the alcohol-catalyst complex thereby destroying the complex and regenerating the catalyst.

Supporting this rationale is the known fact that this chloromethylation reaction is readily quenched by the addition of alcohol or other oxygen-containing solvents, such as dioxane, isopropyl ether, tetrahydrofuran, and acetone, which complex readily with Friedel-Crafts catalysts. Thus under standard conditions, conversion to monochloromethylpolystyrene in 4.5 hours is reduced from 27 percent to 19 percent by pretreatment of a zinc chloride catalyst with 1 mole of methanol per mole of zinc and to less than 6 percent with 2 or more moles of methanol per mole of zinc. Also, it has been observed that bubbling HCl into the chloromethylation reaction mixture destroys catalyst activity, possibly by reversing the acetal equilibrium and thereby increasing the concentration of alcohol.

Further support for this mechanism of catalyst regeneration as well as additional evidence of the surprising effectiveness of this regenerative chloromethylation process was obtained in an experiment with polystyrene in which the zinc chloride catalyst was deliberately deactivated with methanol before addition to the chloromethylation mixture. The mixture remained lemon-yellow in color and essentially no chloromethylation was obtained in 24 hours. Then $SiCl_4$ was slowly added and the color changed to orange and then to the deep red typical of a reactive chloromethylation. Thereafter the chloromethylation proceeded in normal fashion.

The improved chloromethylation process described herein can be advantageously employed with many aromatic materials which contain at least one replaceable nuclear hydrogen atom. Thus, it can be used with such aromatic compounds as benzene, naphthalene, and diphenyl ether as well as with alkylbenzenes such as toluene, xylene, and durene. Other suitable materials include chlorobenzene, benzyl chloride, and bromoethylbenzene.

Then too, this improved process can be advantageously employed to chloromethylate many polymers containing aromatic moieties. Because of the increased specificity of this process resulting in high yields with a decrease in competing side reactions of the chloromethyl substituents, it is particularly useful in the chloromethylation of linear polymers containing aromatic groups. Typical examples of these materials are linear polymers of such vinylaromatic monomers as styrene, vinyltoluene, α-methylstyrene, and vinylpyridine as well as copolymers of such vinylaromatic monomers with other non-aromatic ethylenically unsaturated monomers which are copolymerizable with styrene such as vinyl chloride, acrylonitrile, methyl acrylate, etc. Furthermore, it can be used to chloromethylate cross-linked aromatic polymers such as the conventional styrene-divinylbenzene copolymers used in the synthesis of many commercial ion exchange resins. In this latter application, it results in increased ion-exchange capacity with a minimum of further cross-linking. Polymers containing diphenyl ether moieties can also be chloromethylated by this improved process.

In this improved chloromethylation process, conventional halomethylation catalysts such as zinc chloride, zinc bromide, stannic chloride, and aluminum chloride can be used, preferably as an anhydrous finely divided powder. Since zinc chloride is highly effective in promoting chloromethylation but is less active in catalyzing further reaction of the chloromethyl substituents, zinc chloride or a zinc compound such as zinc oxide or zinc carbonate capable of forming zinc chloride in situ is particularly advantageous as a catalyst.

In the catalyzed alkyl chloromethyl ether process, it is usual to employ chloromethyl methyl ether as the chloromethylation reagent. However, other alkyl chloromethyl ethers such as chloromethyl ethyl ether can be used.

In the practice of the improved chloromethylation process described herein, the aromatic material is dissolved or slurried with two or more parts by weight of the alkyl chloromethyl ether. It is, of course, necessary to employ at least as much alkyl chloromethyl ether as that theoretically required to give the desired degree of chloromethylation, and in general an excess of at least 100 to 150 percent is preferred. Often it is convenient to use 5 or more parts of alkyl chloromethyl ether based on the weight of aromatic material, the excess reagent serving as a diluent to maintain a fluid mixture throughout the reaction. Alternately a portion of the excess alkyl chloromethyl ether can be replaced by another solvent which is resistant to chloromethylation such as chloroform, tetrachloroethane, dichloroethylene, or a saturated aliphatic hydrocarbon.

The amount of halomethylation catalyst required in the improved chloromethylation process varies widely depending upon such factors as the particular catalyst used, the reactivity of the aromatic material, and the reaction conditions as well as the degree of chloromethylation desired. Because the catalyst activity is regenerated during the reaction, less catalyst is necessary in the improved process. For example, to achieve a high degree of monochloromethylation of polystyrene by the Jones process from 0.2 to 0.5 mole of zinc chloride is required per equivalent of polystyrene. In contrast, high conversions and yields are obtained by the regenerative process herein described using from 0.05 to 0.2 mole of zinc chloride per equivalent of polystyrene. In general, this latter ratio of from about 0.05 to 0.2 mole of catalyst per equivalent of desired chloromethylation, i.e., for each chloromethyl group to be added, is a preferred range of catalyst concentration. However, advantageous results are obtained using from about 0.02 to 0.5 mole of catalyst per equivalent of desired chloromethylation.

Likewise, the total amount of regenerative additive used can be varied widely within a range from about 0.05 to 1.5 moles or more per equivalent of desired chloromethylation. It will, of course, depend on the particular additive used as well as such other factors as the nature and amount of catalyst and the desired rate of chloromethylation. For optimum results, it is desirable to use at least one equivalent of regenerative additive for each equivalent of by-product alcohol, i.e., for each equivalent of desired chloromethylation. For example, since $SiCl_4$ and $TiCl_4$ react rapidly with 2 moles of alcohol, addition of about 0.5 mole of $SiCl_4$ or $TiCl_4$ per equivalent of desired chloromethylation is preferred for most effective results. However, $SO_3$ reacts rapidly with only about 1 mole of alcohol under the chloromethylation conditions so a larger amount of this additive is often desirable. However, beneficial results are obtained with as little as 0.05 mole of additive per equivalent of desired chloromethylation while addition of more than 1.5 mole of additive per equivalent of desired chloromethylation is not required for optimum results.

Because of the great reactivity of the regenerative additives, they cannot normally be added in total to the initial reaction mixture without the danger of too vigorous reaction. Thus, it is preferred to add these materials gradually to the reaction mixture throughout the desired reaction period in intermittent portions or as a slow continuous feed. Particularly with a solid additive it is often convenient to dissolve or disperse the material in a small amount of alkyl chloromethyl ether prior to addition.

In general, the regenerative chloromethylation can be carried out at a temperature between about 0° and 60° C. with a reaction time of from about 0.5 to 8 or more hours. For many systems a temperature in the range from 20° to 45° C. is particularly convenient. Normally the reaction is run at atmospheric pressure although moderate superatmospheric pressures can be used. The extent of chloromethylation is readily determined by conventional analytical methods and the product isolated by appropriate means such as precipitation, filtration, distillation, extraction, etc.

The regenerative chloromethylation process described herein is highly effective in giving rapid chloromethylation under mild conditions with resulting high conversions and yields. Optimum reaction conditions for a given system within the general scope of the invention described herein, including the preferred amounts of alkyl chloromethyl ether, catalyst and regenerative additive can be determined by those skilled in the art by a few simple trials.

The following examples illustrate further the invention described herein, but are not to be construed as limiting its scope. Unless otherwise specified, all parts and percentages are by weight.

Example 1.—Zn—SiCl₄ system

A. To a mixture of 104.1 parts (1.0 mole) of an essentially linear polystyrene having a molecular weight of about 25,000 and 402.5 parts (5.0 moles) of chloromethyl methyl ether was added 13.6 parts (0.1 mole) of finely ground, anhydrous $ZnCl_2$. As the mixture was vigorously stirred at room temperature, 85.0 parts (0.50 mole) of $SiCl_4$ was added dropwise over a period of 4 hours. After stirring an additional 2 hours at room temperature, the chloromethylation product was precipitated by quenching the reaction mixture with excess methanol. The methanol insoluble product was isolated and dried to give 152.5 parts of chloromethylated polystyrene. By analysis, this product was found to contain 6.56 meq. of side-chain Cl/g. or an average of 1.00 chloromethyl groups $$(ClCH_2—)/aromatic$$

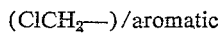

nucleus. The product was completely soluble in toluene and when treated with an excess of trimethylamine gave a water-soluble quaternary ammonium derivative in quantitative yield.

B. In a duplicate experiment except that no $SiCl_4$ was added, the polymer recovered after 6 hours of stirring at room temperature was found to contain only 2.52 meq. of side-chain Cl/g. or an average of 0.30 $ClCH_2$—/aromatic group.

C. In a similar manner, stirring a mixture of 104.1 parts (1.0 mole) of the polystyrene, 402.5 parts (5.0 moles) of chloromethyl methyl ether, and 85.0 parts (0.5 mole) of $SiCl_4$ at room temperature for 6 hours gave a product containing 1.01 meq. of side-chain Cl/g. or an average of only 0.11 $ClCH_2$—/aromatic group. Thus it is evident that $SiCl_4$ alone is not an effective chloromethylation catalyst. However, when used together with a conventional Zn catalyst, it greatly enhances the rate of reaction and yield of chloromethylpolystyrene.

Example 2.—Catalyst regeneration

To illustrate the regeneration of a zinc catalyst, a solution of 6.8 parts (0.5 mole) of $ZnCl_2$ in 4.8 parts (0.15 mole) of methanol was added to a stirred solution of 52.1 parts (0.5 mole) linear polystyrene in 201.2 parts (2.5 moles) of chloromethyl methyl ether. The reaction mixture remained colorless. Then 21.2 parts (0.125 mole) of $SiCl_4$ was added dropwise at a steady rate over 4 hours. About 0.5 hour after the $SiCl_4$ addition was begun, the reaction mixture became red in color and chloromethylation commenced. A sample of the reaction mixture taken 4.5 hours after the $SiCl_4$ addition was begun was analyzed and a 45% conversion to monochloromethylpolystyrene found.

In the absence of added $SiCl_4$, a similar reaction mixture with the methanol deactivated catalyst remained colorless with a conversion to monochloromethylpolystyrene of only about 4% in 4.5 hours. A similar experiment with $ZnCl_2$ catalyst alone gave a conversion of about 27% in 4.5 hours. Obviously, the addition of $SiCl_4$ is effective in regenerating the activity of the zinc catalyst throughout the chloromethylation reaction.

Example 3.—Concentration of Zn and SiCl₄

The general procedure of Example 1A was used to examine the effect of varying amounts and ratios of $ZnCl_2$ and $SiCl_4$. Typical data are presented in Table 1. There was no visible gel formation in any of these runs.

TABLE 1.—REGENERATIVE CHLOROMETHYLATION OF POLYSTYRENE WITH Zn-SiCl₄; 6 HOURS AT 25° C.

| Expt. | $ZnCl_2$ [a] | $SiCl_4$ [a] | Av., $ClCH_2$—/Ar [b] |
|---|---|---|---|
| 3-1 | 0.02 | 0.4 | 0.77 |
| 3-2 | 0.02 | 0.5 | 0.87 |
| 3-3 | 0.05 | 0.4 | 0.85 |
| 3-4 | 0.05 | 0.5 | 1.00 |
| 3-5 | 0.1 | 0.33 | 0.74 |
| 3-6 | 0.1 | 0.4 | 0.83 |
| 3-7 | 0.1 | 0.5 | 0.98 |
| 3-8 | 0.2 | 0.1 | 0.54 |
| 3-9 | 0.2 | 0.25 | 0.65 |
| 3-10 | 0.2 | 0.5 | 0.97 |

[a] Mole/equivalent of polystyrene.
[b] Average chloromethyl content.

It is evident that with 0.5 mole of $SiCl_4$ per equivalent of polystyrene, high conversions to monochloromethylated products were obtained with as little as 0.02 mole of zinc chloride catalyst. To obtain an equivalent conversion by the conventional process required 0.4 mole of $ZnCl_2$ per equivalent of polystyrene and a reaction time of 24 hours. An attempt to increase the rate of conventional chloromethylation by reacting at 35° C. led to gelation in 4 hours with only about 75% monochloromethylation. With 0.5 mole of catalyst per equivalent of polystyrene gelation occurred in less than 0.5 hour at 25° C.

Similar results have been found using soluble polystyrenes of other average molelular weights. Since the sensitivity to cross-linking and gelation increases with increasing molecular weight, the advantage of the regenerative chloromethylation process in permitting the use of mild conditions and low catalyst concentrations becomes even more important with higher molecular weight polystyrene.

Example 4.—Zn—TiCl₄ system

In a manner similar to that described in Example 1 the effectiveness of titanium tetrachloride ($TiCl_4$) as a regenerative additive was established. Representative data for the regenerative chloromethylation of a soluble polystyrene are given in Table 2. Note that a mixture of $TiCl_4$ and $SiCl_4$ is also effective.

TABLE 2.—REGENERATIVE CHLOROMETHYLATION OF POLYSTYRENE WITH Zn-TiCl₄; 6 HOURS AT 25° C.

| Expt. | $ZnCl_2$ [a] | $TiCl_4$ [a] | Av., $ClCH_2$—/Ar [b] |
|---|---|---|---|
| 4-1 | 0 | 0.25 | 0.35 |
| 4-2 | 0.1 | 0.4 | 0.89 |
| 4-3 | 0.2 | 0.25 | 0.68 |
| 4-4 | 0.2 | [c] 0.33 | 0.72 |

[a] Mole/equivalent of polystyrene.
[b] Average chloromethyl content after 6 hrs. at 25° C.
[c] Equimolar mixture of $TiCl_4$ and $SiCl_4$.

Example 5.—Evalution of additives

To screen various materials as catalyst regenerators, a standard procedure was employed using 1 equivalent of a linear polystyrene having an average molecular weight of about 25,000, 5 equivalents of chloromethyl methyl ether, and 0.2 equivalent of zinc catalyst, usually finely divided ZnO. The desired amount of test additive usually 0.5 equivalent was introduced into the stirred chloromethylation mixture in small portions during the initial 3 to 5 hours of the reaction. Product samples were withdrawn after 6 and 24 hours of reaction and analyzed for the extent of chloromethylation.

Under these standard conditions without an additive, the average conversion to monochloromethylpolystyrene was 50% in 6 hours and 62% in 24 hours. As shown in Table 2, the effective regenerative additives, gave conversions of at least 60% in 6 hours and 76% in 24 hours, the product in all cases remaining soluble and gel-free. Although chlorosulfonic acid also gave a marked increase in rate of chloromethylation, the product was largely gelled. Thus with 0.5 equivalent of chlorosulfonic acid, the 6 hour sample was found to be a mixture of an insoluble gel containing about 0.95 $ClCH_2$—/aromatic nucleus and a smaller soluble fraction containing about 0.69 $ClCH_2$—/aromatic nucleus.

It is further evident from Table 3 that some materials such as acetyl chloride, formic acid, and HCl deactivate the catalyst system giving lower conversions than the standard chloromethylation in the absence of a test additive.

TABLE 3.—EVALUATION OF CHLOROMETHYLATION ADDITIVES

| Additive | Amount a | Av., $ClCH_2$—/Ar | |
|---|---|---|---|
| | | 6 hrs. | 24 hrs. |
| A. Blank | | 0.50 | 0.62 |
| B. $SiCl_4$ | 0.5 | 0.96 | |
| $TiCl_4$ | 0.4 | 0.89 | 0.96 |
| $SO_3$ | 0.5 | 0.79 | 0.93 |
| $SO_3$ | 1.0 | 0.93 | |
| $(ClCO)_2$ | 0.5 | 0.69 | 0.87 |
| $PCl_5$ | 0.5 | 0.62 | 0.89 |
| $SOCl_2$ | 0.5 | 0.61 | 0.76 |
| $H_2SO_4$ | 1.0 | 0.60 | 0.83 |
| C. HCHO | b 1.0 | 0.56 | 0.66 |
| $SO_2Cl_2$ | 0.5 | 0.45 | 0.63 |
| $CH_3SiCl_3$ | 0.33 | 0.51 | 0.63 |
| $(CH_3)_2SiCl_2$ | 0.5 | 0.43 | 0.43 |
| $POCl_3$ | 0.5 | 0.36 | 0.63 |
| $PCl_3$ | 0.5 | 0.40 | 0.58 |
| $CH_3COCl$ | 1.0 | 0.44 | 0.58 |
| $CF_3COOH$ | 1.0 | 0.41 | 0.43 |
| HCOOH | 1.0 | 0.25 | 0.29 |
| HCl | (c) | 0.15 | 0.27 | a Mole/equivalent of polystyrene.
b Added with initial charge.
c HCl bubbled continuously through the reaction mixture.

*Example 6.—Sn—$SiCl_4$ catalyst*

To a mixture of 52.0 parts (0.5 mole) of soluble polystyrene and 6.5 parts (0.025 mole) of stannic chloride in 201.2 parts (2.5 moles) of chloromethyl methyl ether stirred at room temperature was added dropwise over a period of about 4 hours 27.2 parts (0.16 mole) of $SiCl_4$. Analysis of product samples taken after 6 and 24 hours showed 81% and 92% monochloromethylation, respectively. In the absence of added $SiCl_4$, conversions of only 21% and 30% were obtained with similar reaction times.

In a similar manner the regenerative chloromethylation additives are advantageously employed with other conventional halomethylation catalysts to achieve high conversions at lower catalyst concentrations.

*Example 7.—Ion exchange resin*

To a stirred slurry of 300 parts of chloromethyl methyl ether and 100 parts of 20–50 mesh styrene-divinylbenzene copolymer beads containing 2% of copolymerized divinylbenzene was added a solution of 8 parts (0.10 mole) of zinc oxide in 50 parts of chloromethyl methyl ether. Then to this chloromethylation reaction mixture was added dropwise over a period of 3.5 hours 85 parts (0.5 mole) of $SiCl_4$. Subsequently after quenching the chloromethylation with methanol, the resin was recovered, slurried with methylene chloride and aminated with trimethylamine. The resulting anion exchange resin was recovered in conventional manner and found to have a wet volume capacity of 0.76 meq./ml., a water content of 70.3% and a dry weight capacity of 3.93 meq./g., properties generally similar to standard resins prepared from these copolymer beads. In the absence of the added $SiCl_4$, however, a dry weight capacity of only about 1.60 meq./g. is obtained with the zinc chloromethylation catalyst under similar conditions.

*Example 8.—Chloromethylation of aromatic compounds*

A. Using the general process described in Example 1A, benzene was chloromethylated at room temperature using 4 moles of chloromethyl methyl ether, 0.1 mole of zinc oxide, and 0.5 mole of $SiCl_4$ per mole of benzene with the $SiCl_4$ being added gradually over a period of 4 hours. Samples of the reaction mixture were taken after 6 hours and analyzed with a mass spectrophotometer. Data from several runs are summarized in Table 4.

TABLE 4.—CHLOROMETHYLATION OF BENZENE; 6 HRS. AT 25° C.

| Product | Process | |
|---|---|---|
| | Conventional | Regenerative |
| Composition (wt. percent): | | |
| Benzene | 68 | 6.2 |
| Benzyl chloride | 29 | 73.5 |
| Xylylene chloride | 1.4 | 18.5 |
| Highers | 0 | 0.9 |
| Av., $ClCH_2$—/Ar | 0.22 | 1.03 |

The improved results obtained with the regenerative chloromethylation are evident. Note also that xylylene chloride was formed by further reaction of the initial product, benzyl chloride. By control of the reaction conditions, high yields of either benzyl chloride or xylylene chloride can be obtained by the regenerative chloromethylation process.

B. To a mixture of 70 parts (0.5 mole) of 2-bromoethylbenzene, 160 parts (2.0 moles) of chloromethyl methyl ether and 2.0 parts (0.025 mole) of zinc oxide stirred at room temperature was added 42.4 parts (0.25 mole) of $SiCl_4$ over a period of 4 hours. After another 2 hours of stirring the reaction was quenched with excess methanol and water. Extraction with methylene chloride and then removal of the solvent gave 84.3 parts (72% yield) of crude 2-bromoethylbenzyl chloride which slowly crystallized on standing.

To achieve a comparable rate of chloromethylation in the absence of $SiCl_4$ required at least a 5-fold increase in amount of zinc oxide catalyst.

In a similar manner the regenerative chloromethylation process can be advantageously employed to chloromethylate many other aromatic compounds including toluene, xylene, durene, naphthalene, and chlorobenzene, giving high conversions and yields with low catalyst concentration and mild reaction conditions.

I claim:
1. In a process for the chloromethylation of aromatic compounds and polymers containing aromatic groups by reacting said aromatic material with an excess of an alkyl chloromethyl ether in the presence of a chloromethylation catalyst, the improvement which comprises (A) using a chloromethylation catalyst selected from the group consisting of stannic chloride, zinc chloride and zinc compounds capable of forming zinc chlorides in situ, and (B) adding to the chloromethylation reaction mixture from 0.05 to 1.5 moles of a catalyst regenerant per equivalent of aromatic chloromethylation, said regenerant being selected from the group consisting of silicon tetrachloride, titanium tetrachloride, and sulfur trioxide.
2. The process of claim 1 wherein the alkyl chloromethyl ether is chloromethyl methyl ether.
3. The process of claim 1 wherein the catalyst regenerant is silicon tetrachloride.
4. The process of claim 1 wherein the catalyst regenerant is titanium tetrachloride.
5. The process of claim 1 wherein the catalyst regenerant is sulfur trioxide.
6. The process of claim 1 wherein the chloromethylation catalyst is a zinc compound capable of forming zinc chloride in situ.
7. The process of claim 1 wherein the aromatic material is an essentially linear, toluene-soluble vinylaromatic polymer.
8. The process of claim 1 wherein the aromatic material is an insoluble, cross-linked vinylaromatic polymer.
9. The process of claim 1 wherein the aromatic material is an aromatic hydrocarbon having at least one replaceable nuclear hydrogen atom.

10. The process of claim 1 wherein the aromatic material is a polystyrene and the chloromethylation catalyst is zinc chloride.

11. An improved process for the chloromethylation of aromatic materials which consists essentially of:
 (A) Adding silicon tetrachloride gradually to an agitated chloromethylation reaction mixture consisting essentially of the aromatic material, chloromethyl methyl ether, and a zinc chloromethylation catalyst at a temperature between about 0° to 60° C., said reactants being in the ratios of from about 0.1 to 1.0 mole of silicon tetrachloride, from about 2 to 10 moles of chloromethyl methyl ether, and from about 0.02 to 0.4 mole of zinc catalyst per equivalent of desired chloromethylation;
 (B) Continuing the reaction at a temperature between about 0° and 60° C. until the desired degree of chloromethylation is obtained; and
 (C) Recovering the chloromethylated product.

References Cited by the Examiner
UNITED STATES PATENTS

| | | | |
|---|---|---|---|
| 2,694,702 | 11/1954 | Jones | 260—93.5 |
| 2,714,125 | 7/1955 | Gerner | 260—651 |
| 2,873,299 | 2/1959 | Mikeska | 260—651 |

JOSEPH L. SCHOFER, *Primary Examiner.*

J. A. SEIDLECK, *Assistant Examiner.*